United States Patent [19]

Abney

[11] Patent Number: 5,319,726
[45] Date of Patent: Jun. 7, 1994

[54] MULTI-LINE PASSIVE FIBER OPTIC SLIPRING

[75] Inventor: Darrell T. Abney, Virginia Beach, Va.

[73] Assignee: The United States of America as represented by the Secretary of the Navy, Washington, D.C.

[21] Appl. No.: 129,725

[22] Filed: Sep. 30, 1993

[51] Int. Cl.$^5$ .............................................. G02B 6/26
[52] U.S. Cl. ...................................... 385/26; 385/25; 385/33
[58] Field of Search ....................... 385/26, 25, 33–36; 359/813, 814; 250/227.11, 227.14

[56] References Cited

U.S. PATENT DOCUMENTS 4,900,117 2/1990 Chen ...................................... 385/26
4,943,137 7/1990 Speer ...................................... 385/26

Primary Examiner—Rodney B. Bovernick
Assistant Examiner—Phan Thi. Heartney
Attorney, Agent, or Firm—Michael J. McGowan; Prithvi C. Lall; Michael F. Oglo

[57] ABSTRACT

A multi-line, passive fiber optic slipring is provided. A plurality of transmitting optical fibers are terminated in a plurality of focusing lenses. The fibers and focusing lens are free to rotate about an axis rotation. A plurality of ellipsoidal mirrors are stacked on top of one another beneath the focusing lenses such that the axis of rotation passes through a first focal point of each of the plurality of ellipsoidal mirrors. Each of the focusing lenses focuses optical signals through the first focal point of a corresponding one of the ellipsoidal mirrors. The optical signals reflect from each corresponding mirror to a second focal point of the corresponding mirror. Each mirror is further provided with an optical aperture along the axis of rotation to allow the optical signals not focused on the first focal point of the corresponding mirror to pass therethrough. Each of a plurality of receiving optical fibers is fixed at a corresponding one of the second focal points.

13 Claims, 4 Drawing Sheets

MULTI-LINE PASSIVE FIBER OPTIC SLIPRING

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to optical sliprings, and more particularly to a multi-line, fiber optic slipring that is constructed from passive components.

(2) Description of the Prior Art

Present devices used to pass multiple fiber optic lines through a rotating joint generally comprise one of two types. The first type is a passive device known as a coiled ribbon slipring which places optical fibers parallel to each other to form a ribbon cable. The ribbon cable is coiled around the slipring's axis of rotation. One end of the cable is connected to the stationary side of the slipring, while the other end is connected to the rotating side of the slipring. The advantage of this device is that it can pass multiple fiber optic lines through a rotating joint without the use of active conversion devices (e.g., optical-to-electrical conversion devices). However, this type of device is limited to a specific number of rotations determined by the number of times the cable is coiled around itself.

The second type of prior art optical slipring is an active conversion device in which signals from multiple fiber optic lines pass through a rotating joint by using devices that convert the optical signals into electrical signals, send the electrical signals through the joint using conventional electrical slipring methods, and then convert the electrical signals back into optical signals. This type of slipring has the advantage of an unlimited number of rotations, but has several disadvantages in that (1) power is needed to operate the active conversion devices, (2) electrical noise and electromagnetic interference may be introduced, and (3) cross talk between channels may occur.

SUMMARY OF THE INVENTION

Accordingly, it is an object of the present invention to provide a multi-line, fiber optic slipring.

Another object of the present invention is to provide a slipring that permits multiple fiber optic lines to pass through a rotating joint without the use of active conversion devices.

Still another object of the present invention is to provide a slipring that permits multiple fiber optic lines to pass through a rotating joint while allowing an unlimited number of rotations of the joint in either direction.

In accordance with the present invention, a multi-line, passive fiber optic slipring is provided wherein plurality of transmitting optical fibers are terminated in a plurality of focusing lenses fixed along a line in a common plane. Each transmitting optical fiber and focusing lens is free to rotate about an axis perpendicular to the common plane. A plurality of ellipsoidal mirrors are stacked on top of one another beneath the focusing lenses such that the axis of rotation passes through a first focal point of each of the plurality of ellipsoidal mirrors. Each of the focusing lenses focuses optical signals through the first focal point of one of the corresponding ellipsoidal mirrors. The optical signals are reflected from each corresponding mirror to a second focal point of each corresponding mirror. Each mirror is further provided with an optical aperture along the axis of rotation to allow the optical signals not focused on the first focal point of the corresponding mirror to pass therethrough. Each of a plurality of receiving optical fibers is fixed at one of the corresponding second focal points.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 1:
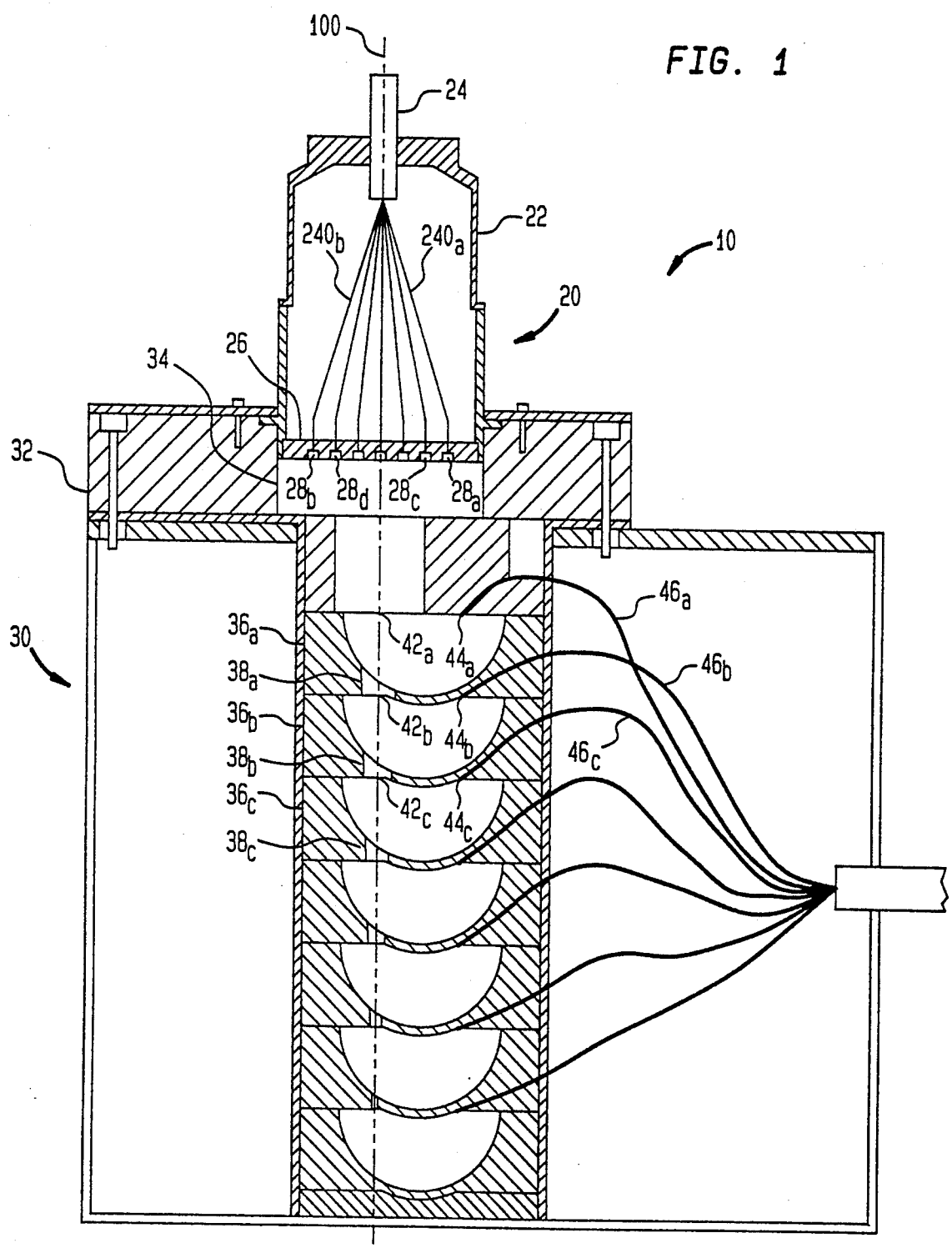
FIG. 1 is a cross-sectional view of a preferred embodiment multi-line fiber optic slipring according to the present invention.

Referring now to the drawings, and more particularly to FIG. 1, a cross-sectional view of a preferred embodiment multiline fiber optic slipring is shown and referenced generally by the numeral 10. Slipring 10 includes a rotating portion 20 and a stationary portion 30. Rotating portion 20 is free to rotate 360 degrees in either direction about a central axis of rotation 100.

Rotating portion 20 consists of a rotor housing 22 that supports an optical fiber cable 24 and an opaque disk 26. Housed within opaque disk 26 are a plurality of lenses 28a, 28b, (e.g., convex focusing lenses) used to terminate a corresponding plurality of optical fibers 240a, 240b, . . . extending from optical fiber cable 24.

Figure 2:
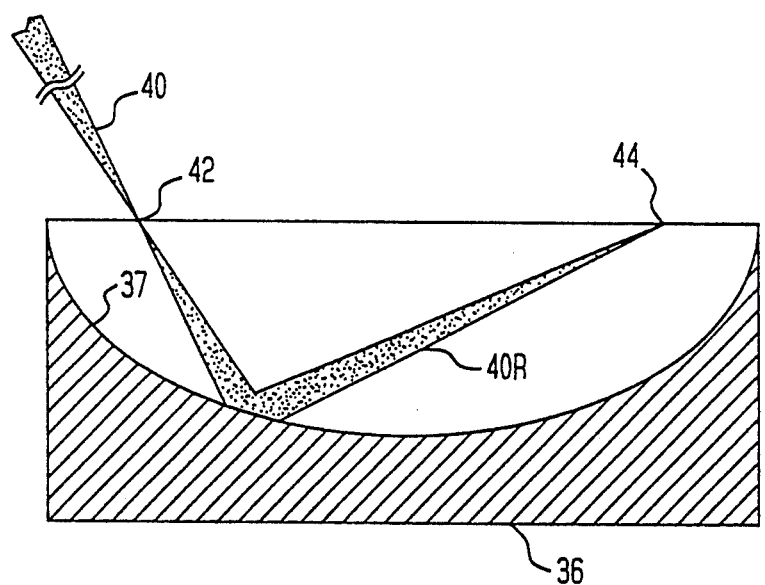
FIG. 2 is a cross-sectional view of an ellipsoidal mirror's two focal points and an optical signal path passing through both focal points.

Stationary portion 30 consists of a housing 32 with a sleeve 34 for receiving rotating portion 20. Beneath rotating portion 20 are a plurality of ellipsoidal mirrors 36a, 36b, . . . Before going further, it is necessary to understand certain optical characteristics exhibited by ellipsoidal mirrors. In particular, regardless of its specific shape, an ellipsoidal mirror has two focal points. Any optical signal traveling through one focal point and striking the surface of the ellipsoid will be reflected toward the second focal point of the ellipsoid. This characteristic is illustrated in FIG. 2 for an ellipsoidal mirror 36. An incident optical signal 40 is focused from any angle so that its focal point is superimposed or coincident with a first focal point 42 of ellipsoidal mirror 36. Passing through first focal point 42, optical signal 40 diverges, strikes and then reflects off the surface 37 of ellipsoidal mirror 36. The reflected optical signal 40R then converges at a second focal point 44 of ellipsoidal mirror 36.

Referring again to FIG. 1, slipring 10 takes advantage of the above described optical properties of an ellipsoidal mirror in the following manner. Each ellipsoidal mirror 36a, 36b, . . . is arranged in a stacked line as shown such that axis of rotation 100 passes through the respective first focal point 42a, 42b, . . . of ellipsoidal mirrors 36a, 36b, . . . Respective focusing lenses 28a, 28b, . . . are selected to have focal points that are coincident with the respective first focal points 42a, 42b, . . . Thus, each first focal point 42a, 42b, . . . receives optical signals from only one corresponding focusing lens 28a, 28b, . . . Then, as directed above, optical signals (not shown in FIG. 1 for purposes of clarity) passing through first focal points 42a, 42b, . . . are reflected to respective second focal points 44a, 44b, . . . Fixed at each respective second focal point 44a, 44b, . . . is a receiver (e.g., a receiving optical fiber 46a, 46b, . . .) terminating at corresponding second focal points 44a, 44b, . . .

To facilitate the passing of all optical signals other than those focused on an ellipsoidal mirror's respective first focal point, each ellipsoidal mirror 36a, 36b, . . . is provided with a respective optically transmissive aperture 38a, 38b, . . . Each aperture 38a, 38b, . . . resides in an unused (i.e., not a reflective surface for the incoming optical signal passing through the mirror's first focal point) portion of the respective ellipsoidal mirror. For the preferred embodiment, focusing lenses 28a, 28b, . . . are centered about and lie in a plane perpendicular to axis of rotation 100. Accordingly, each aperture 38a, 38b, . . . is similarly centered on axis of rotation 100.

Figure 3:
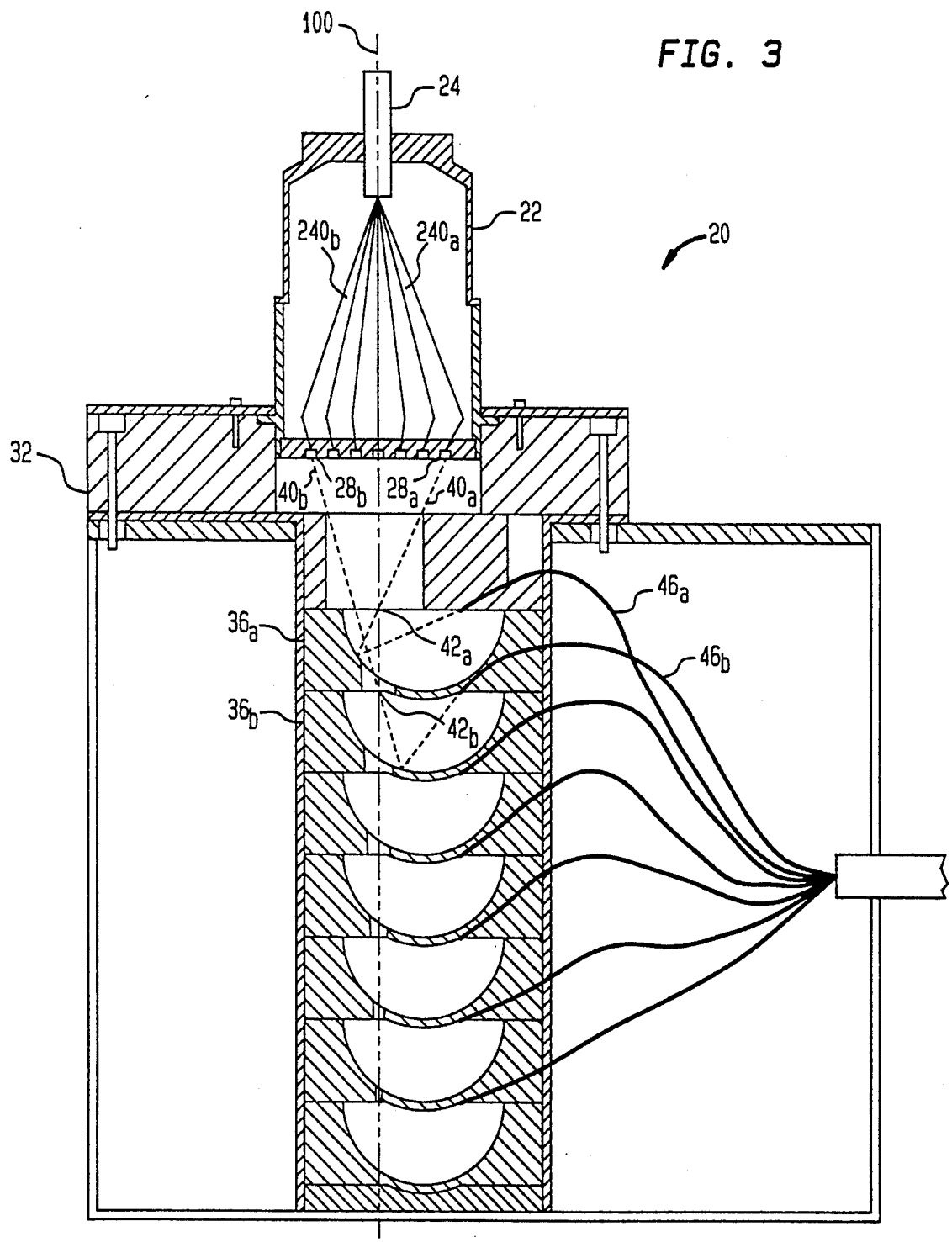
FIG. 3 is a cross-sectional view of the slipring of FIG. 1 showing the optical signal paths traversed by two optical signals transmitted by two distinct optical fibers.

An illustration of how optical signals 40a, 40b, . . . pass through slipring 10 is shown in FIG. 3 where like reference numerals have been used for those elements in common with FIG. 1. For purpose of clarity only the paths of optical signals 40a and 40b are shown as dotted lines. Note that in the present invention, rotating portion 20 can rotate in either direction while maintaining coincidental focal points between each focusing lens 28a, 28b, . . . and respective first focal point 42a, 42b, . . . Further, the slipring is free to rotate for an unlimited number of rotations. Finally, the slipring is constructed solely from passive components thereby eliminating any of the drawbacks associated with active conversion type sliprings.

Figure 4:
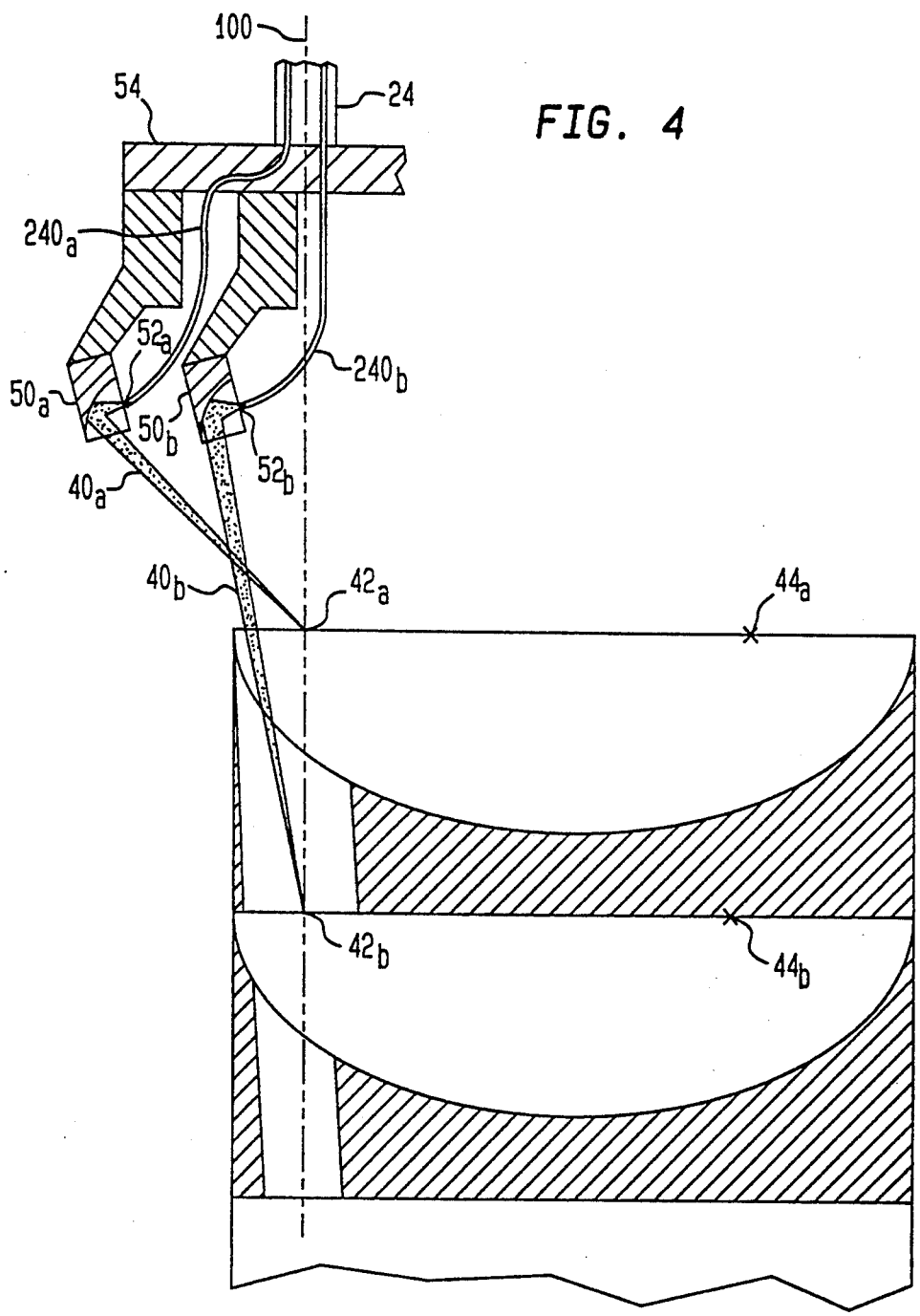
FIG. 4 is an alternative embodiment of the slipring's rotating portion.

In addition, although the present invention has been described relative to a particular embodiment, it is not so limited. For example, rotating portion 20 could be implemented as shown in FIG. 4 where each optical fiber 240a, 240b, from optical cable 24 is terminated at a corresponding transmitting mirror's 50a, 50b, . . . focal point 52a, 52b, . . . Each mirror 50a, 50b, . . . would be mounted on a disk 54 that rotates about axis of rotation 100. Optical signals 40a, 40b, . . . from fibers 240a, 240b, . . . diverge, strike respective mirrors 50a, 50b, . . . reflect and converge on respective first focal points 42a, 42b, . . . where operation of the slipring would continue as described above.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A fiber optic slipring comprising:
a plurality of transmitting optical fibers, each transmitting optical fiber transmitting optical signals therein;
a plurality of focusing lenses fixed along a line in a common plane, wherein said each transmitting optical fiber terminates at a corresponding one of said plurality of focusing lenses, and wherein said plurality of optical fibers terminated at said plurality of focusing lenses are free to rotate about an axis perpendicular to said common plane;
a plurality of ellipsoidal mirrors stacked on top of one another, wherein said axis passes through a first focal point of each of said plurality of ellipsoidal mirrors;
each of said plurality of focusing lenses focusing said optical signals through said first focal point of a corresponding one of said plurality of ellipsoidal mirrors, wherein said optical signals reflect from each said corresponding one of said plurality of ellipsoidal mirrors to a second focal point of each said corresponding one of said plurality of ellipsoidal mirrors;
each of said plurality of ellipsoidal mirrors being further provided with an optical aperture along said axis for allowing said optical signals not focused on said first focal point of said corresponding one of said plurality of ellipsoidal mirrors to pass therethrough; and
each of a plurality of receiving optical fibers being fixed at a corresponding one of said second focal points.

2. The fiber optic slipring as in claim 1 wherein said axis is centered between said plurality focusing lenses.

3. The fiber optic slipring as in claim 2 wherein each said optical aperture is centered on said axis.

4. The fiber optic slipring as in claim 1 wherein each of said plurality of focusing lenses is a convex lens.

5. The fiber optic slipring as in claim 1 further comprising a disk of opaque material for housing said plurality of focusing lenses.

6. A fiber optic slipring comprising:
means, rotating about an axis of rotation, for focusing optical signals from each of a plurality of optical fibers to corresponding unique focal points on said axis of rotation;
a plurality of ellipsoidal mirrors, each of said plurality of ellipsoidal mirrors having first and second focal points wherein, for each of said plurality of ellipsoidal mirrors, any of said optical signals passing through said first focal point are reflected to said second focal point;
said plurality of ellipsoidal mirrors being arranged linearly along said axis of rotation, wherein said first focal point for each of said plurality of ellipsoidal mirrors coincides with one of said corresponding unique focal points;
each of said plurality of ellipsoidal mirrors further being provided with an optical aperture sized to allow said optical signals not coinciding with said one corresponding unique focal point to pass therethrough; and
means, located at each of said second focal points, for receiving said optical signals reflected thereto.

7. The fiber optic slipring as in claim 6 wherein said means for focusing said optical signals comprises a plurality of focusing lenses housed within an opaque disk, each of said plurality of focusing lenses receiving optical signals from a corresponding one of said plurality of optical fibers.

8. The fiber optic slipring as in claim 7 wherein each of said plurality of focusing lenses lies in a common plane.

9. The fiber optic slipring as in claim 8 wherein each of said plurality of focusing lenses lies along a line in said common plane.

10. The fiber optic slipring as in claim 9 wherein said common plane is perpendicular to said axis of rotation.

11. The fiber optic slipring as in claim 8 wherein said common plane is perpendicular to said axis of rotation.

12. The fiber optic slipring as in claim 7 wherein each of said plurality of focusing lenses is a convex lens.

13. The fiber optic slipring as in claim 6 wherein each said optical aperture is centered on said axis of rotation.

* * * * *